United States Patent [19]

Nakano et al.

[11] Patent Number: 5,229,037
[45] Date of Patent: Jul. 20, 1993

[54] ELECTROCONDUCTIVE SILOCONE RUBBER COMPOSITION CONTAINING A METAL

[75] Inventors: Akio Nakano; Mikio Iino, both of Annaka, Japan

[73] Assignee: Shin-Etsu Chemical Co., Ltd., Tokyo, Japan

[21] Appl. No.: 604,899

[22] Filed: Oct. 30, 1990

[30] Foreign Application Priority Data

Oct. 31, 1989 [JP] Japan .................. 1-284363

[51] Int. Cl.$^5$ .................. H01B 1/02; H01B 1/06; C08K 3/08; C08K 5/54
[52] U.S. Cl. .................. 252/512; 252/511; 252/513; 252/514; 524/440; 524/730; 428/331
[58] Field of Search .................. 252/511, 512, 513, 514; 524/440, 730, 731, 588; 428/331

[56] References Cited

U.S. PATENT DOCUMENTS

| | | | |
|---|---|---|---|
| 3,609,104 | 9/1971 | Ehrreich | 252/512 |
| 4,533,604 | 8/1985 | Honda et al. | 252/511 |
| 5,082,596 | 1/1992 | Fukuda et al. | 252/511 |

FOREIGN PATENT DOCUMENTS

| | | | |
|---|---|---|---|
| 3933979 | 4/1990 | Fed. Rep. of Germany | 252/511 |
| 61-108661 | 5/1986 | Japan | |
| 63-156858 | 4/1988 | Japan | 252/511 |
| 63-255561 | 10/1988 | Japan | |
| 1-213362 | 8/1989 | Japan | 252/513 |
| 2-102263 | 4/1990 | Japan | |

*Primary Examiner*—Paul R. Michl
*Assistant Examiner*—Tae H. Yoon
*Attorney, Agent, or Firm*—Millen, White, Zelano & Branigan

[57] ABSTRACT

The electroconductive silicone rubber composition of the invention is prepared by compounding a diorganopolysiloxane with each a specified amount of spherical particles of a cured silicone elastomer, metallic electroconductivity-imparting agent, e.g., metal powder, and a curing agent, e.g., organic peroxide. The composition has good molding workability and is capable of giving a cured electroconductive silicone rubber body having good mechanical properties along with high electroconductivity despite the formulation including the metal powder. Improvements can be obtained in the elastic resilience and permanent compression set of the cured silicone rubber body by the admixture of the composition with a specific liquid organosilicon compound having a phenyl group or an alkyl group of 3 to 10 carbon atoms bonded to the silicon atoms.

8 Claims, No Drawings

ELECTROCONDUCTIVE SILOCONE RUBBER COMPOSITION CONTAINING A METAL

BACKGROUND OF THE INVENTION

The present invention relates to an electroconductive silicone rubber composition, or, more particularly, to an electroconductive silicone rubber composition which can be prepared industrially at a relatively low cost, has excellent workability and is capable of giving a cured silicone rubber article having good rubbery properties despite the use of a substantial amount of a metallic electroconductivity-imparting agent to be useful as a material of various kinds of electrodes, electroconductive rubber rollers, shielding members against electromagnetic waves, electronic devices and the like. The invention also relates to a cured electroconductive silicone rubber article obtained by shaping and curing the above mentioned electroconductive silicone rubber composition.

As is well known, silicone rubbers in general have excellent heat and cold resistance and weatherability as well as excellent electric insulation so that they are widely used in a variety of application fields as an electrically insulating rubbery material. On the other hand, electroconductive silicone rubbers are also known and have a volume resistivity of, for example, from $10^{-4}$ to $10^6$ ohm·cm. Such an electroconductive silicone rubber composition is prepared by compounding an insulating silicone rubber composition with a substantial amount of an electroconductivity-imparting agent depending on the electroconductivity desired. The electroconductivity-imparting agent suitable for compounding with a silicone rubber composition includes so-called $\pi$-electron-transfer type electroconductive materials such as carbon black, graphite powder, carbon fibers and the like and so-called free electron-transfer type electroconductive materials such as powders, flakes, fibers and the like of a metal or metalloid, e.g., silver, nickel, copper zinc, iron, gold and silicon.

A highly electroconductive silicone rubber composition having a volume resistivity not exceeding $10^{-1}$ ohm·cm can be obtained only by using a metallic electroconductivity-imparting agent. For example, a highly electroconductive silicone rubber composition having a volume resistivity of from $10^{-3}$ to $10^{-4}$ ohm·cm can be obtained by incorporating a sufficiently large amount of a powder of a noble metal such as silver, gold and the like. A fatal problem in such a highly electroconductive silicone rubber composition is, needless to say, the very high production costs thereof due to the expensiveness of the noble metal powder.

In this regard, a proposal has been made in Japanese Patent Kokai No. 58-63198 and No. 59-100756, according to which the electroconductivity-imparting agent is a powder of an inorganic material such as glass, mica, alumina, carbon and the like of which the particles are coated or plated with a metal such as silver, nickel and the like. A problem in the electroconductive silicone rubber composition of this type is in the relatively low stability of the electroconductivity because the metallic surface on the filler particles is gradually oxidized in the lapse of time to cause an increase in the volume resistivity of the silicone rubber composition. Although admixture of an amine compound as an antioxidant is effective to some extent to prevent oxidation of the metallic surface by air, the oxidation-preventing effect thereof is lost almost completely when the silicone rubber article is kept at an elevated temperature.

It is also taught in Japanese Patent Publication No. 46-41694 that a highly electroconductive silicone rubber composition can be obtained by compounding a relatively small amount of a metallic electroconductivity-imparting agent with an insulating silicone rubber composition when the metallic powder is used in combination with a fine powder of a cured silicone rubber. According to the disclosure therein, the powder of the cured silicone rubber used is prepared by pulverizing a cured mass of a silicone rubber. A problem in the use of such a powder of a cured silicone rubber is that the silicone rubber composition compounded therewith has very poor workability in processing and molding. Further, a proposal has been made in Japanese Patent Kokai No. 61-108661 and No. 63-251464 for the preparation of an electroconductive silicone rubber composition in which the electroconductivity-imparting agent is a powder of a cured electroconductive silicone rubber containing a relatively large amount of carbon black. Although such an electroconductive silicone rubber is advantageous in respect of the stability of the electroconductivity, a problem therein is that a highly electroconductive silicone rubber composition having a volume resistivity not exceeding $10^{-1}$ ohm·cm can hardly be obtained by compounding a carbon black-loaded cured silicone rubber powder.

SUMMARY OF THE INVENTION

The present invention accordingly has an object to provide a highly electroconductive silicone rubber composition free from the above described problems and disadvantages in the conventional electroconductive silicone rubber compositions as well as to provide a highly electroconductive cured silicone rubber article obtained by curing the above mentioned silicone rubber composition.

Thus, the electroconductive silicone rubber composition of the invention comprises, as a blend:
(a) 100 parts by weight of a diorganopolysiloxane represented by the average unit formula $R^1_n SiO_{(4-n)/2}$, in which $R^1$ is an unsubstituted or substituted monovalent hydrocarbon group and the subscript n is a positive number in the range from 1.95 to 2.05;
(b) from 5 to 100 parts by weight of spherical particles of a cured silicone elastomer having an average particle diameter in the range from 0.1 to 50 $\mu$m;
(c) from 100 to 1200 parts by weight of a metallic electroconductivity-imparting agent; and
(d) a curing agent of a silicone rubber in an amount sufficient to cure the composition.

Optionally, the above defined silicone rubber composition may further comprise: (e) up to 20 parts by weight of a liquid organosilicon compound represented by the average unit formula $R^2_a R^3_b X_c SiO_{(4-a-b-c)/2}$, in which $R^2$ is a methyl group or a lower alkenyl group, $R^3$ is a phenyl group or an unsubstituted or substituted alkyl group having from 3 to 10 carbon atoms, X is a hydrogen atom, hydroxy group or hydrolyzable group, the subscripts a and c are each zero or a positive number smaller than 4 and the subscript b is a positive number not exceeding 4 with the proviso that a+b+c is in the range from 2 to 4.

DETAILED DESCRIPTION OF THE PREFERRED EMBODIMENTS

As is described above, the essential ingredients in the inventive electroconductive silicone rubber composition are the components (a) to (d) and the composition is characterized by the combination of the components (b) and (c) each in a specified amount. The composition has excellent workability in processing and molding with a relatively low consistency. When the composition is further compounded with the optional component (e) which is a specific liquid organosilicon compound, the advantageous effect by the formulation with the component (b) can be further enhanced and the disadvantageous influences caused by the component (c) such as retardation of curing of the rubber compositon and cracking of the diorganopolysiloxane molecules can be effectively prevented.

The component (a) comprised in the electroconductive silicone rubber composition of the invention is a diorganopolysiloxane represented by the average unit formula

$$R^1_n SiO_{(4-n)/2}, \qquad (I)$$

in which $R^1$ is an unsubstituted or substituted monovalent hydrocarbon group exemplified by alkyl groups such as methyl, ethyl, propyl and butyl groups, cycloalkyl groups such as cyclopentyl and cyclohexyl groups, alkenyl groups such as vinyl and allyl groups and aryl groups such as phenyl and tolyl groups as well as those substituted groups obtained by replacing a part or all of the hydrogen atoms in the above named hydrocarbon groups with halogen atoms, cyano groups and the like such as chloromethyl, 3,3,3-trifluoropropyl and 2-cyanoethyl groups. It is optional that the diorganopolysiloxane molecules have two kinds or more of different hydrocarbon groups selected from the above named ones according to need. The subscript n in the average unit formula (I) is a positive number in the range from 1.95 to 2.05. Preferably, the diorganopolysiloxane as the component (a) is a dimethylpolysiloxane having a linear molecular structure of which some of the methyl groups are replaced with phenyl groups, vinyl groups and/or 3,3,3-trifluoropropyl groups. The diorganopolysiloxane should preferably have a degree of polymerization of at least 100 because, when the degree of polymerization of the diorganopolysiloxane is too low, the silicone rubber composition prepared therefrom cannot give a cured silicone rubber body having mechanical properties as high as desired.

The component (b) compounded with the above described component (a) is a powder of a cured silicone elastomer consisting of spherical particles having a specified average particle diameter. This component serves to improve the molding workability of the silicone rubber composition and the cured silicone rubber body obtained from the composition has good rubbery elasticity with a low hardness and may exhibit a very low permanent compression set. Further, the electroconductive silicon rubber composition compounded with this component (b) may have high electroconductivity even without excessively increasing the amount of the metallic electroconductivity-imparting agent as the component (c) described below.

Several methods have been proposed for the preparation of spherical particles of a cured silicone elastomer including the method disclosed in Japanese Patent Kokai No. 59-96222, according to which a curable organopolysiloxane is sprayed and cured in a spray drier at a temperature in the range from 230° to 300° C. and the method disclosed in Japanese Patent Kokai No. 62-257939, according to which an organopolysiloxane composition of the addition reaction type consisting of a vinyl group-containing organopolysiloxane and an organohydrogenpolysiloxane is emulsified in an aqueous medium by using a surface active agent in such a manner that the emulsion particles have a particle diameter not exceeding 20 μm with admixture of a platinum compound as a catalyst for the addition reaction and the emulsion is spray-dried to effect curing of the organopolysiloxane composition before or in the course of the spray drying. The spherical particles of the cured silicone elastomer should have an average particle diameter in the range from 0.1 to 50 μm or, preferably, from 0.5 to 30 μm. The lower limit of the above mentioned range is given by the difficulty in the preparation of finer spherical particles in addition to the problem that a silicone rubber composition compounded with such finer spherical particles cannot be imparted with the effect as desired in the formulation of the component (b). When the average particle diameter of the spherical particles is too large, on the other hand, the silicone rubber composition compounded with such a coarse powder of spherical particles would be poor in the workability in molding.

The amount of the spherical particles of the cured silicone elastomer in the inventive composition should be in the range from 5 to 100 parts by weight or, preferably, from 10 to 60 parts by weight per 100 parts by weight of the diorganopolysiloxane as the component (a). When the amount thereof is too small, the desired effect by the addition thereof cannot be obtained while, when the amount thereof is too large, the silicone rubber composition cannot give a cured silicone rubber article having mechanical strengths as high as desired.

The metallic electroconductivity-imparting agent as the component (c) compounded in the electroconductive silicone rubber composition of the invention is a finely divided form, e.g., powders and fibers, of a metal such as nickel, copper, silver, gold and the like or a finely divided composite form of an inorganic material such as particles and fibers of glass, mica, alumina and the like coated or plated with a metal such as nickel, silver, gold and the like. The amount of the metallic electroconductivity-imparting agent compounded in the inventive composition should be in the range from 100 to 1200 parts by weight or, preferably, from 200 to 600 parts by weight per 100 parts by weight of the diorganopolysiloxane as the component (a). When the amount thereof is too small, the silicone rubber composition cannot be imparted with high electroconductivity as a matter of course. When the amount thereof is too large, on the other hand, the silicone rubber composition would be poor in the moldability and the cured silicone rubber article obtained from the composition would have poor mechanical properties.

The component (d) compounded in the inventive silicone rubber composition is a curing agent of organopolysiloxane compositions. Any of conventional curing agents used in the art of silicone rubbers can be used without particular limitations. A class of the curing agents includes organic peroxides pertaining to a free-radical reaction such as di-tert-butyl peroxide, 2,5-dimethyl-2,5-di(tert-butylperoxy) hexane and the like.

Another class of the curing agents, when the diorganopolysiloxane as the component (a) has alkenyl groups bonded to the silicon atoms in the molecule, is a combination of an organohydrogenpolysiloxane having at least two hydrogen atoms directly bonded to the silicon atoms in a molecule and a trace amount of a platinum compound as a catalyst. Further, when the diorganopolysiloxane as the component (a) has functional groups pertaining to the condensation reaction to form cross links, the curing agent can be a combination of a polyfunctional alkoxy-containing silane or polysiloxane compound as a crosslinking agent and an organic acid salt of a metal as a catalyst for the condensation reaction.

The component (e) compounded in the inventive silicone rubber composition as an optional ingredient is a liquid organosilicon compound which is added with an object to enhance the advantageous effects obtained by compounding the spherical particles of a cured silicone elastomer as the component (b). This component also has an effect to prevent inhibition of curing of the composition and cracking of the organopolysiloxane molecules due to the addition of the metallic electroconductivity-imparting agent as the component (c) since this component is contained in the composition as localized on and around the fine particles or fibers of the metallic electroconductivity-imparting agent as a consequence of the poor miscibility thereof with the diorganopolysiloxane as the component (a).

The liquid organosilicon compound as the component (e) is represented by the average unit formula

$$R^2_a R^3_b X_c SiO_{(4-a-b-c)/2}, \quad (II)$$

in which $R^2$ is a methyl group or a lower alkenyl group such as vinyl, allyl and butenyl groups, $R^3$ is a phenyl group or an unsubstituted or substituted monovalent hydrocarbon group having 3 to 10 carbon atoms, X is a hydrogen atom, hydroxy group or hydrolyzable group, the subscripts a and c are each zero or a positive number smaller than 4 and the subscript b is a positive number not exceeding 4 with the proviso that $a+b+c$ is in the range from 2 to 4. It is preferable that the organosilicon compound as the component (e) has a kinematic viscosity not exceeding 1000 centistokes at 25° C. because the desirable effect to be obtained by the addition of this component cannot be fully exhibited when the viscosity thereof is too high.

The liquid organosilicon compound in conformity with the above given average unit formula (II) includes organosilanes and organopolysiloxanes of which particular examples include those expressed by the following names and formulas, in which Me is a methyl group, Ph is a phenyl group, the subscript p is a positive integer not exceeding 4, the subscript q is zero or a positive integer not exceeding 4 and the subscript r is 4, 5 or 6:
methyl diphenyl silanol;
methyl diphenyl diacetoxy silane;
1,3,3,5-tetramethyl-1,1,5,5-tetraphenyl trisiloxane;
$Me_3Si-O-(SiPh_2-O-)_p-(-SiMe_2-O-)_q-SiMe_3$; and
$HO-[-SiMe(CH_2CH_2CF_3)-O-]_r-H$.

As is mentioned before, addition of this liquid organosilicon compound as the component (e) in the inventive composition is optional. When it is added, the amount thereof is preferably 20 parts by weight or smaller per 100 parts by weight of the diorganopolysiloxane as the component (a). When the amount thereof is too large, disadvantages are caused such as poor moldability of the composition, decrease in the mechanical strengths of the cured silicone rubber body obtained from the composition, bleeding of the liquid component on the surface of the cured silicone rubber body and so on. When a substantial advantageous effect is desired by the admixture of the component (e), the amount thereof should be at least 0.1 part by weight per 100 parts by weight of the diorganopolysiloxane as the component (a). Thus, the amount of the component (e) is preferably in the range from 0.1 to 10 parts by weight per 100 parts by weight of the component (a).

It is optional according to need that the electroconductive silicone rubber composition of the invention further comprises various kinds of fillers including reinforcing fillers such as precipitated silica fillers, fumed silica fillers and the like and non-reinforcing fillers such as clay, calcium carbonate, diatomaceous earth, titanium dioxide and the like. Various kinds of other known additives can of course be added to the inventive composition including dispersion aids such as low-molecular siloxane esters, silanol compounds, e.g., diphenyl silane diol, and the like, heat-resistance improvers such as iron oxide, ceric oxide, iron octoate and the like, pigments for coloring, flame retardants such as platinum compounds, and so on.

The electroconductive silicone rubber composition of the present invention can be prepared by blending and kneading the above described components (a) to (e) and other optional additives each in a specified amount by using a suitable blending machine such as mixing rollers, kneaders, Bunbury mixers and the like. It is usually preferable that the organopolysiloxane components are first uniformly blended with the electroconductivity-imparting agent followed by the admixture of the curing agent and other additives.

The electroconductive silicone rubber composition of the present invention prepared in the above described manner can be shaped and cured into cured electroconductive silicone rubber body by any conventional rubber molding method such as compression molding, transfer molding, extrusion molding, injection molding, calendering and the like depending on the types of the desired products. The cured electroconductive silicone rubber body of the invention has high electroconductivity and rubbery elasticity and is characteristic in the low hardness and low permanent compression set so that the silicone rubber composition of the invention is useful as a material of various kinds of electrodes, electroconductive rubber rollers, shields against electromagnetic waves, electronic devices and the like.

In the following, the electroconductive silicone rubber composition of the present invention is illustrated in more detail by way of examples and comparative examples, in which the term of "parts" always refers to "parts by weight".

EXAMPLE 1

An electroconductive silicone rubber composition, referred to as the composition No. 1 hereinbelow, was prepared by blending, in a two-roller mill, 50 parts of a silicone rubber compound (KE-951U, a product by Shin-Etsu Chemical Co.) and 50 parts of a methyl vinyl polysiloxane having an average degree of polymerization of about 8000 consisting of 99.85% by moles of dimethyl siloxane units and 0.15% by moles of methyl vinyl siloxane units, followed by successive admixture of 400 parts of a commercially obtained electroconductive silver powder having a particle diameter of 0.1 to 1.0 μm (AgC-BO, a product by Fukuda Metal Foils & Powders Industry Co.), 20 parts of a powdery silicone elastomer of spherical particles having a diameter of 3 to 15 μm (KMP-594, a product by Shin-Etsu Chemical Co.) and 2 parts of an organic peroxide (C-8, a product by Shin-Etsu Chemical Co.).

The thus prepared silicone rubber composition No. 1 was compression-molded under the conditions of the temperature of 165° C., pressure of 30 kg/cm² and length of time of 10 minutes into test specimens of a sheet of 1 mm thickness and a stud-like piece of 28 mm diameter and 12 mm height. These test specimens were subjected to a heat treatment at 200° C. for 1 hour and then to the measurements of the hardness, elastic resilience, permanent compression set after 22 hours at 150° C. under compression and volume resistivity to give the results shown in Table 1 below.

EXAMPLE 2

Three electroconductive silicone rubber compositions, referred to as the compositions No. 2, No. 3 and No. 4 hereinbelow, were prepared each in substantially the same formulation and in substantially the same manner as in Example 1 described above excepting an increase of the amount of the spherical silicone elastomer particles to 30 parts and 40 parts in the compositions No. 2 and No. 3, respectively, and omission thereof in No. 4. These compositions were each compression-molded and subjected to the measurements of the properties in the same manner as in Example 1. The results of the measurements are shown also in Table 1.

EXAMPLE 3

Five electroconductive silicone rubber compositions, referred to as the compositions No. 5 to No. 9 hereinbelow, were prepared each by admixing the composition No. 2 prepared in Example 2 with 2 parts of one of the liquid organosilicon compounds A, B, C, D and E, respectively, characterized below.

A: methyl diphenyl silanol
B: 1,3,3,5-tetramethyl-1,1,-5,5-tetraphenyl trisiloxane
C: 1,7-dihydroxy-1,3,5,7-tetramethyl-1,3,5,7-tetra(3,3,3-trifluoropropyl) tetrasiloxane
D: α,ω-divinyl polydimethylsiloxane having a degree of polymerization of 52
E: dimethyl dimethoxy silane The compounds A and B each have phenyl groups bonded to the silicon atoms and the compound C has alkyl groups of 3 or larger number of carbon atoms.

These compositions No. 5 to No. 9 were each compression-molded into test specimens in the same manner as in Example 1 and subjected to the measurements of the properties to give the results shown in Table 1.

As is clear from these results, improvements can be obtained in the elastic resilience and permanent compression set of the test specimens by the admixture of the composition with a liquid organnosilicon compound having a phenyl group or an alkyl group of 3 to 10 carbon atoms in a molecule.

TABLE 1

| Composition No. | Hardness, JIS | Elastic resilience, % | Permanent compression set, % | Volume resistivity, ohm · cm |
|---|---|---|---|---|
| 1 | 71 | 46 | 62 | $4.4 \times 10^{-4}$ |
| 2 | 62 | 52 | 65 | $4.7 \times 10^{-4}$ |
| 3 | 60 | 54 | 66 | $6.9 \times 10^{-4}$ |
| 4 | 78 | 36 | 70 | $3.2 \times 10^{-4}$ |
| 5 | 64 | 56 | 38 | $4.3 \times 10^{-4}$ |
| 6 | 65 | 55 | 42 | $4.1 \times 10^{-4}$ |
| 7 | 62 | 57 | 40 | $4.5 \times 10^{-4}$ |
| 8 | 60 | 48 | 63 | $5.0 \times 10^{-4}$ |
| 9 | 62 | 40 | 61 | $4.3 \times 10^{-4}$ |

What is claimed is:
1. An electroconductive silicone rubber composition which comprises, as a blend:
   (a) 100 parts by weight of a diorganopolysiloxane represented by the average unit formula $R^1_n SiO_{(4-n)/2}$, in which $R^1$ is an unsubstituted or substituted monovalent hydrocarbon group and the subscript n is a positive number in the range from 1.95 to 2.05;
   (b) from 5 to 100 parts by weight of spherical particles of a cured silicone elastomer having an average particle diameter in the range from 0.1 to 50 μm;
   (c) from 100 to 1200 parts by weight of a metallic electroconductivity-imparting agent;
   (d) a curing agent of a silicone rubber in an amount sufficient to cure the composition; and
   (e) 0.1 to 20 parts by weight of a liquid organosilicon compound represented by the average unit formula $R^2_a R^3_b X_c SiO_{(4-a-b-c)/2}$, in which $R^2$ is a mehtyl group or a lower alkenyl group, $R^3$ is a phenyl group or an unsubstituted or substituted alkyl group having from 3 to 10 carbon atoms, X is a hydrogen atom, hydroxy group or hydrolyzable group, the subscripts a and c are each zero or a positive number smaller than 4 and the subscript b is a positive number not exceeding 4 with the proviso that a+b+c is in the range from 2 to 4.

2. The electroconductive silicone rubber composition as claimed in claim 1 wherein component (e) is present in an amount of 0.1 to 10 parts by weight.

3. The electroconductive silicone rubber composition as claimed in claim 1 in which the diorganopolysiloxane as the component (a) has an average degree of polymerization of at least 100.

4. The electroconductive silicone rubber composition as claimed in claim 1 in which the spherical particles of a cured silicone elastomer have an average particle diameter in the range from 0.5 to 30 μm.

5. The electroconductive silicone rubber composition as claimed in claim 1 in which the metallic electroconductivity-imparting agent is a powder of a metal selected from the group consisting of nickel, copper, silver and gold.

6. The electroconductive silicone rubber composition as claimed in claim 1 in which the curing agent is an organic peroxide.

7. An electroconductive shaped and cured silicone rubber article which is a cured body of the electroconductive silicone rubber composition according to claim 1.

8. The electroconductive silicon rubber composition as claimed in claim 1, wherein the amount of (c) is 200-600 parts by weight.

* * * * *